(12) United States Patent
Lainema et al.

(10) Patent No.: US 8,724,692 B2
(45) Date of Patent: May 13, 2014

(54) APPARATUS, A METHOD AND A COMPUTER PROGRAM FOR VIDEO CODING

(75) Inventors: Jani Lainema, Tampere (FI); Kemal Ugur, Tampere (FI)

(73) Assignee: Nokia Corporation, Espoo (FI)

( * ) Notice: Subject to any disclaimer, the term of this patent is extended or adjusted under 35 U.S.C. 154(b) by 332 days.

(21) Appl. No.: 12/986,885

(22) Filed: Jan. 7, 2011

(65) Prior Publication Data

US 2012/0121013 A1    May 17, 2012

Related U.S. Application Data

(60) Provisional application No. 61/293,468, filed on Jan. 8, 2010.

(51) Int. Cl.
*H04N 19/00* (2014.01)
*H04N 7/32* (2006.01)
*H04N 7/26* (2006.01)

(52) U.S. Cl.
CPC . *H04N 7/32* (2013.01); *H04N 19/00* (2013.01)
USPC ............................................ 375/240

(58) Field of Classification Search
CPC ... H04N 7/32; H04N 19/00; H04N 19/00018; H04N 19/00278; H04N 19/00303
USPC ..................... 375/240.12, E07.243
See application file for complete search history.

(56) References Cited

U.S. PATENT DOCUMENTS

| | | | | |
|---|---|---|---|---|
| 8,149,910 B2 * | 4/2012 | Tanizawa et al. | ........ | 375/240.12 |
| 8,254,450 B2 * | 8/2012 | Ugur et al. | ............... | 375/240.13 |
| 2007/0121731 A1 | 5/2007 | Tanizawa et al. | | |
| 2009/0052528 A1 * | 2/2009 | Jeon et al. | ................ | 375/240.12 |
| 2009/0052535 A1 | 2/2009 | Ugur et al. | | |
| 2009/0097557 A1 * | 4/2009 | Takahashi et al. | ........ | 375/240.12 |
| 2009/0310677 A1 * | 12/2009 | Shiodera et al. | ......... | 375/240.15 |

FOREIGN PATENT DOCUMENTS

| EP | 1 761 063 A2 | 3/2007 |
|---|---|---|
| WO | 2004064406 A1 | 7/2004 |
| WO | 2008123753 A1 | 10/2008 |
| WO | WO-2009/051419 A2 | 4/2009 |

OTHER PUBLICATIONS

International Search Report and Written Opinion, received in corresponding Patent Cooperation Treaty Application No. PCT/IB2011/050072, Dated Apr. 14, 2011. 13 pages.

(Continued)

*Primary Examiner* — Jay Patel
*Assistant Examiner* — Reza Aghevli
(74) *Attorney, Agent, or Firm* — Alston & Bird LLP

(57) ABSTRACT

An apparatus, a method and a computer program product for video coding are provided including selecting an encoding method from a set of encoding methods comprising at least a first encoding method and a second encoding method for encoding a block of pixels of an image; selecting at least one control point among the pixels of the block of pixels, wherein the control pixel is selected from any pixel of the block of pixels; and selecting a first reference point different from the control point; determining values of the other pixels of the selected block of pixels on the basis of the value of the control point and the value of the at least one reference point.

27 Claims, 12 Drawing Sheets

(56) References Cited

OTHER PUBLICATIONS

Horowitz, Michael, et al., "H.264/AVC Baseline Profile Decoder Complexity Analysis", IEEE Transactions on Circuits and Systems for Video Technology, vol. 13, No. 7, Jul. 2003, pp. 704-716.

Korean Office Action for Application No. 2012-7020718, dated Aug. 30, 2013.

Lainema, J., et al.; "*Intra picture coding with planar representation*;" Picture Coding Symposium; pp. 198-201; dated Dec. 8-10, 2010.

Nan, Z., et al.; "*Spatial prediction based intra-coding*;" 2004 International Conference on Multimedia and Expo, vol. 1; pp. 97-100; dated Jun. 27-30, 2004; retrieved on Feb. 21, 2014 from <https://www.researchgate.net/publication/4124530_Spatial_prediction_based_intra-codin_video_coding>.

Ugur, K., et al.; "*Appendix to Description of video coding technology proposal by Tandberg Nokia Ericsson*;" Joint Collaborative Team on Video Coding (JVC-VC) of ITU-T SG16 WP3 and ISO/IEC JTC1/SC29/WG11; dated Apr. 15-23, 2010.

Extended European Search Report for Application No. 11731721.4; dated Feb. 13, 2014.

\* cited by examiner

APPARATUS, A METHOD AND A COMPUTER PROGRAM FOR VIDEO CODING

RELATED APPLICATION

This application claims prioirty to U.S. Application No. 61/293,468 filed Jan. 8, 2010, which is incorporated herein by reference in its entirety.

TECHNICAL FIELD

The present invention relateds to an apparatus, a method and a computer program for coding and decoding.

BACKGROUND INFORMATION

A video codec may comprise an encoder which transforms input video into a compressed representation suitable for storage and/or transmission and a decoder that can uncompress the compressed video representation back into a viewable form, or either one of them. Typically, the encoder discards some information in the original video sequence in order to represent the video in a more compact form, for example at a lower bit rate.

Typical video codecs, operating for example according to the International Telecommunication Union's ITU-T H.263 and H.264 coding standards, encode video information in two phases. In the first phase, pixel values in a certain picture area or "block" are predicted. These pixel values can be predicted, for example, by motion compensation mechanisms, which involve finding and indicating an area in one of the previously encoded video frames (or a later coded video frame) that corresponds closely to the block being coded. Additionally, pixel values can be predicted by spatial mechanisms which involve finding and indicating a spatial region relationship.

Prediction approaches using image information from a previous (or a later) image can also be called as Inter prediction methods, and prediction approaches using image information within the same image can also be called as Intra prediction methods.

The second phase is one of coding the error between the predicted block of pixels and the original block of pixels. This is typically accomplished by transforming the difference in pixel values using a specified transform. This transform is typically a Discrete Cosine Transform (DCT) or a variant thereof. After transforming the difference, the transformed difference is quantized and entropy encoded.

By varying the fidelity of the quantization process, the encoder can control the balance between the accuracy of the pixel representation, (in other words, the quality of the picture) and the size of the resulting encoded video representation (in other words, the file size or transmission bit rate). An example of the encoding process is illustrated in FIG. 4a.

The decoder reconstructs the output video by applying a prediction mechanism similar to that used by the encoder in order to form a predicted representation of the pixel blocks (using the motion or spatial information created by the encoder and stored in the compressed representation of the image) and prediction error decoding (the inverse operation of the prediction error coding to recover the quantized prediction error signal in the spatial domain).

After applying pixel prediction and error decoding processes the decoder combines the prediction and the prediction error signals (the pixel values) to form the output video frame.

The decoder (and encoder) may also apply additional filtering processes in order to improve the quality of the output video before passing it for display and/or storing as a prediction reference for the forthcoming frames in the video sequence.

An example of the decoding process is illustrated in FIG. 6a.

In typical video codecs, the motion information is indicated by motion vectors associated with each motion compensated image block. Each of these motion vectors represents the displacement of the image block in the picture to be coded (in the encoder) or decoded (at the decoder) and the prediction source block in one of the previously coded or decoded images (or pictures). In order to represent motion vectors efficiently, motion vectors are typically coded differentially with respect to block specific predicted motion vector. In a typical video codec, the predicted motion vectors are created in a predefined way, for example by calculating the median of the encoded or decoded motion vectors of the adjacent blocks.

In typical video codecs the prediction residual after motion compensation is first transformed with a transform kernel (like DCT) and then coded. The reason for this is that often there still exists some correlation among the residual and transform can in many cases help reduce this correlation and provide more efficient coding.

Typical video encoders utilize the Lagrangian cost function to find optimal coding modes, for example the desired macro block mode and associated motion vectors. This type of cost function uses a weighting factor or □ to tie together the exact or estimated image distortion due to lossy coding methods and the exact or estimated amount of information required to represent the pixel values in an image area.

This may be represented by the equation:

$$C = D + \Box R \quad (1)$$

where C is the Lagrangian cost to be minimised, D is the image distortion (for example, the mean-squared error between the pixel values in original image block and in coded image block) with the mode and motion vectors currently considered, and R is the number of bits needed to represent the required data to reconstruct the image block in the decoder (including the amount of data to represent the candidate motion vectors).

Some hybrid video codecs, such as H.264/AVC, predict the Intra coded areas by spatial means utilizing the pixel values of the already processed areas in the picture. The difference between the predicted pixel values and the original ones is coded in a lossy manner utilizing DCT-like transform. Quantization of the transform coefficients may result in artefacts in the reconstructed video signal. These artefacts are especially visible if the transformed area or part of the transformed area has no high frequency content (that is, the pixel values are almost identical or change gradually over an area). Typical examples of such cases are human faces and sky. These are both characterized by gradual spatial changes in color which is not represented satisfactorily in the decoded video when the operation bitrate is moderately low (resulting in usage of moderate quantization of transform coefficients). The effect can be more severe when the amount of changes in the pixel values is smaller than what can be represented with the quantized AC coefficients of the transform. In this case the picture with gradually changing pixel values will look blocky as its decoded pixel values are represented with the DC coefficient of the transform alone.

In addition to the blocking artefact, coarse quantization of transform coefficients may cause another type of an artefact called ringing. Ringing artefacts are characterized by introducing additional edges around the object boundaries in video signal. The ringing artefacts become more visible if an image block contains an object boundary with flat areas on either side or both sides the edge.

In some known constructions the problem with blockiness of the decoded video signal is handled with filtering the image. However filtering the image introduces additional complexity for both encoder and decoder, and especially in this case the number of pixels that need to be filtered can be very large. Practically all pixels in the area may need to be processed. For example in H.264/AVC typically only two pixels at the 8×8 block boundary are filtered, but yet the filtering operations are taking substantial amount of total processing power of an optimized decoder.

SUMMARY

This invention proceeds from the consideration that by omitting the spatial prediction and transform operations at selected areas of the image and providing a way to generate pixel values of at least a part of the selected area by an interpolation a more efficient encoding and visually more pleasant reproduction of the image may be achieved.

Some embodiments of the invention provides video encoders and decoders an efficient mode of operation resulting in visually pleasing decoded pictures even when coarse quantization of DCT coefficients is utilized. This is achieved by omitting the spatial prediction and DCT transform operations for selected areas of the image and defining a spatial surface covering the picture block to be processed, with no or only small discontinuities on the edges of the block, and the image areas already processed. In the case the image blocks are scanned in a typical left-to-right and up-to-down order, the surface can be defined, for example, by sending a single parameter corresponding to the pixel value of the lower right corner of the block being processed and interpolating the rest of the samples.

According to a first aspect of the invention, there is provided an apparatus comprising:
  a selector configured for selecting an encoding method from a set of encoding methods comprising at least a first encoding method and a second encoding method for encoding a block of pixels of an image;
  wherein said selector is further configured for:
  selecting at least one control point among the pixels of said block of pixels; and
  selecting a first reference point different from said control point;
  wherein the apparatus further comprises a determinator configured for determining values of the other pixels of said selected block of pixels on the basis of the value of said control point and the value of said at least one reference point.

According to a second aspect of the invention there is provided a method comprising:
  selecting an encoding method from a set of encoding methods comprising at least a first encoding method and a second encoding method for encoding a block of pixels of an image;
  wherein said first encoding method comprises:
  selecting at least one control point among the pixels of said block of pixels;
  selecting a first reference point different from said control point; and
  determining values of the other pixels of said selected block of pixels on the basis of the value of said control point and the value of said at least one reference point.

According to a third aspect of the invention there is provided a computer readable storage medium stored with code thereon for use by an apparatus, which when executed by a processor, causes the apparatus to perform:
  selecting an encoding method from a set of encoding methods comprising at least a first encoding method and a second encoding method for encoding a block of pixels of an image;
  wherein for said first encoding method said code when executed by the processor, it further causes the apparatus to:
  select at least one control point among the pixels of said block of pixels;
  select a first reference point different from said control point; and
  determine values of the other pixels of said selected block of pixels on the basis of the value of said control point and the value of said at least one reference point.

According to a fourth aspect of the invention there is provided at least one processor and at least one memory, said at least one memory stored with code thereon, which when executed by said at least one processor, causes an apparatus to perform:
  selecting an encoding method from a set of encoding methods comprising at least a first encoding method and a second encoding method for encoding a block of pixels of an image;
  wherein said first encoding computer program product comprises:
  selecting at least one control point among the pixels of said block of pixels;
  selecting a first reference point different from said control point; and
  determining values of the other pixels of said selected block of pixels on the basis of the value of said control point and the value of said at least one reference point.

According to a fifth aspect of the invention there is provided an apparatus which comprises:
  an analyser configured for examining an indication of an encoding method of a block of pixels of an image to be decoded;
  a decoding method selector configured for selecting a first decoding method when said determined encoding method is a first encoding method; and
  a reconstructor configured for:
  selecting at least one control point among the pixels of said block of pixels to be decoded; and
  selecting a first reference point different from said control point; and
  determining values of the other pixels of said block of pixels to be decoded on the basis of the value of said control point and the value of said at least one reference point.

According to a sixth aspect of the invention there is provided a method comprising:
  examining an indication of an encoding method of a block of pixels of an image to be decoded;
  selecting a first decoding method when said determined encoding method is a first encoding method;
  selecting at least one control point among the pixels of said block of pixels;
  selecting a first reference point different from said control point; and
  determining values of the other pixels of said selected block of pixels on the basis of the value of said control point and the value of said at least one reference point.

According to a seventh aspect of the invention there is provided a computer readable storage medium stored with code thereon for use by an apparatus, which when executed by a processor, causes the apparatus to perform:

determining an encoding method of an encoded block of pixels of an image to decode the encoded block of pixels;

selecting a first decoding method when said determined encoding method is a first encoding method;

selecting at least one control point among the pixels of said encoded block of pixels;

selecting a first reference point different from said control point; and determining values of the other pixels of said encoded block of pixels on the basis of the value of said control point and the value of said at least one reference point.

According to an eighth aspect of the invention there is provided at least one processor and at least one memory, said at least one memory stored with code thereon, which when executed by said at least one processor, causes an apparatus to perform:

determining an encoding method of an encoded block of pixels of an image to decode the encoded block of pixels;

selecting a first decoding method when said determined encoding method is a first encoding method;

selecting at least one control point among the pixels of said encoded block of pixels;

selecting a first reference point different from said control point; and determining values of the other pixels of said encoded block of pixels on the basis of the value of said control point and the value of said at least one reference point.

According to a ninth aspect of the invention there is provided an encoder comprising:

a selector configured for selecting an encoding method from a set of encoding methods comprising at least a first encoding method and a second encoding method for encoding a block of pixels of an image;

wherein said selector is further configured for:

selecting at least one control point among the pixels of said block of pixels; and selecting a first reference point different from said control point;

wherein the apparatus further comprises a determinator configured for determining values of the other pixels of said selected block of pixels on the basis of the value of said control point and the value of said at least one reference point.

According to a tenth aspect of the invention there is provided a decoder which comprises:

an analyser configured for examining an indication of an encoding method of a block of pixels of an image to be decoded;

a decoding method selector configured for selecting a first decoding method when said determined encoding method is a first encoding method; and a reconstructor configured for:

selecting at least one control point among the pixels of said block of pixels to be decoded; and selecting a first reference point different from said control point; and determining values of the other pixels of said block of pixels to be decoded on the basis of the value of said control point and the value of said at least one reference point.

According to an eleventh aspect of the invention there is provided an apparatus which comprises:

means for selecting an encoding method from a set of encoding methods comprising at least a first encoding method and a second encoding method for encoding a block of pixels of an image;

means for selecting at least one control point among the pixels of said block of pixels;

means for selecting a first reference point different from said control point; and means for determining values of the other pixels of said selected block of pixels on the basis of the value of said control point and the value of said at least one reference point.

According to a twelfth aspect of the invention there is provided an apparatus which comprises:

means for examining an indication of an encoding method of a block of pixels of an image to be decoded;

means for selecting a first decoding method when said determined encoding method is a first encoding method;

means for selecting at least one control point among the pixels of said block of pixels to be decoded;

means for selecting a first reference point different from said control point; and means for determining values of the other pixels of said block of pixels to be decoded on the basis of the value of said control point and the value of said at least one reference point.

DESCRIPTION OF THE DRAWINGS

For better understanding of the present invention, reference will now be made by way of example to the accompanying drawings in which.

DETAILED DESCRIPTION OF SOME EXAMPLE EMBODIMENTS OF THE INVENTION

Figure 1:
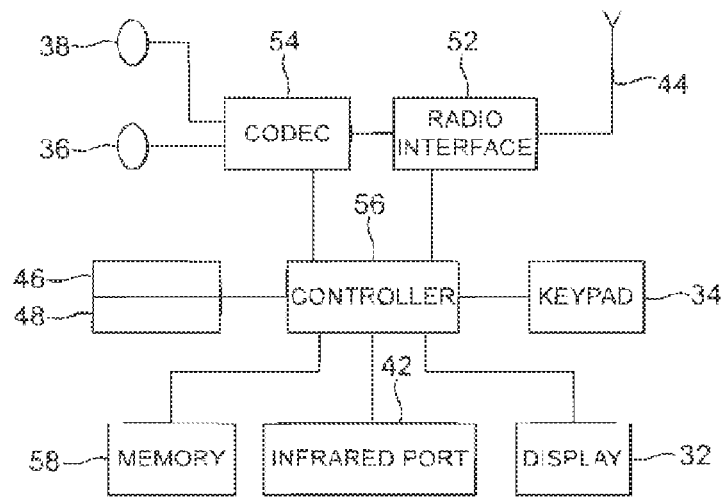
FIG. 1 shows schematically an electronic device employing some embodiments of the invention.
Figure 2:
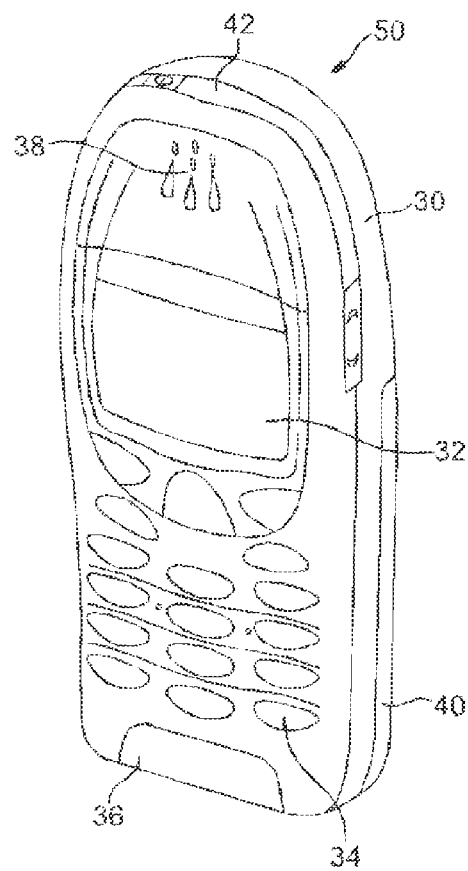
FIG. 2 shows schematically a user equipment suitable for employing some embodiments of the invention.

The following describes in further detail suitable apparatus and possible mechanisms for the provision of enhancing encoding efficiency and signal fidelity for a video codec. In this regard reference is first made to FIG. 1 which shows a schematic block diagram of an exemplary apparatus or electronic device 50, which may incorporate a codec according to an embodiment of the invention.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise an infrared port 42 for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera capable of recording or detecting individual frames which are then passed to the codec 54 or controller for processing. In other embodiments of the invention, the apparatus may receive the video image data for processing from another device prior to transmission and/or storage. In other embodiments of the invention, the apparatus 50 may receive either wirelessly or by a wired connection the image for coding/decoding.

Figure 3:
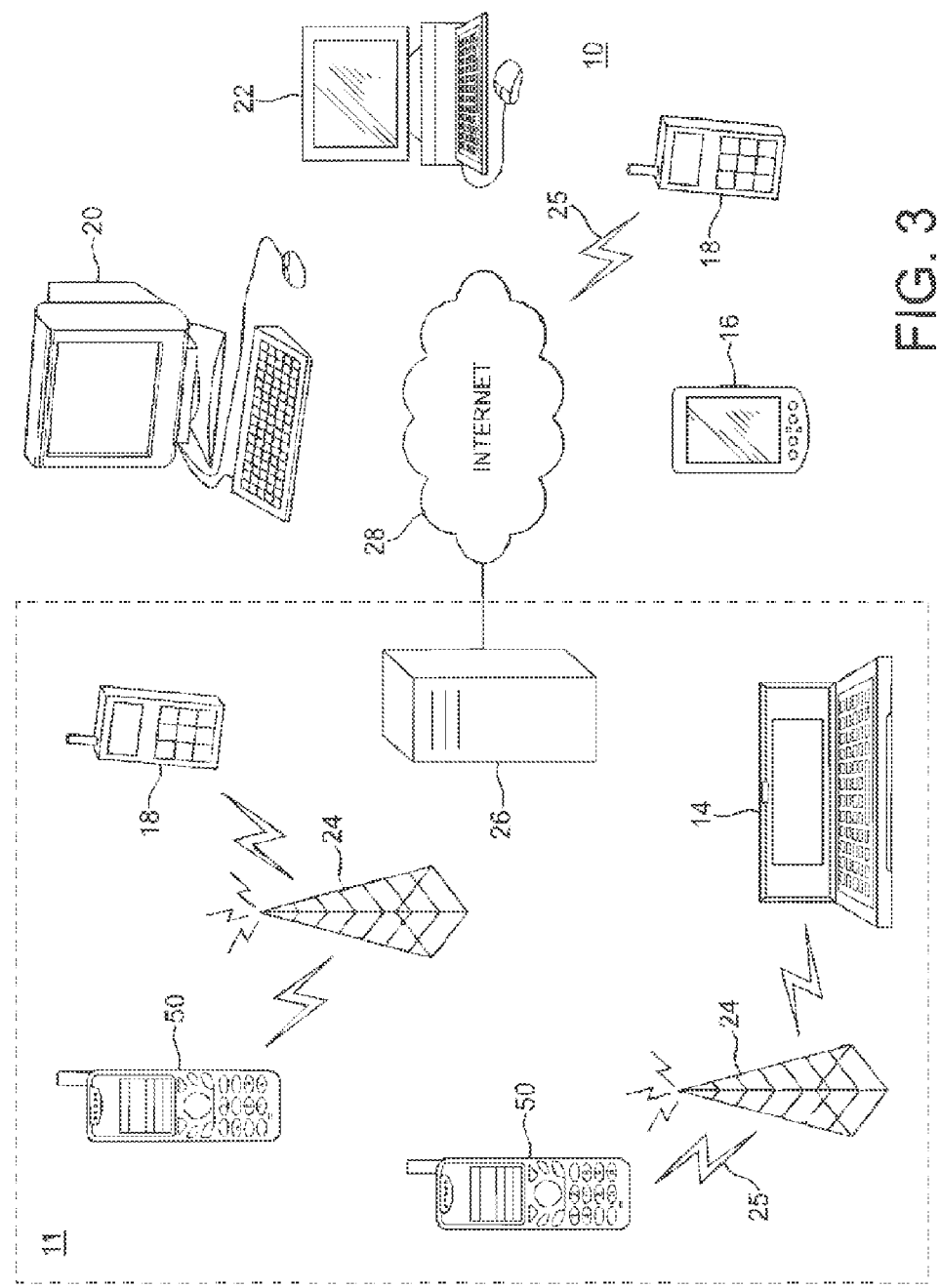
FIG. 3 further shows schematically electronic devices employing embodiments of the invention connected using wireless and wired network connections.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

Figure 4A:
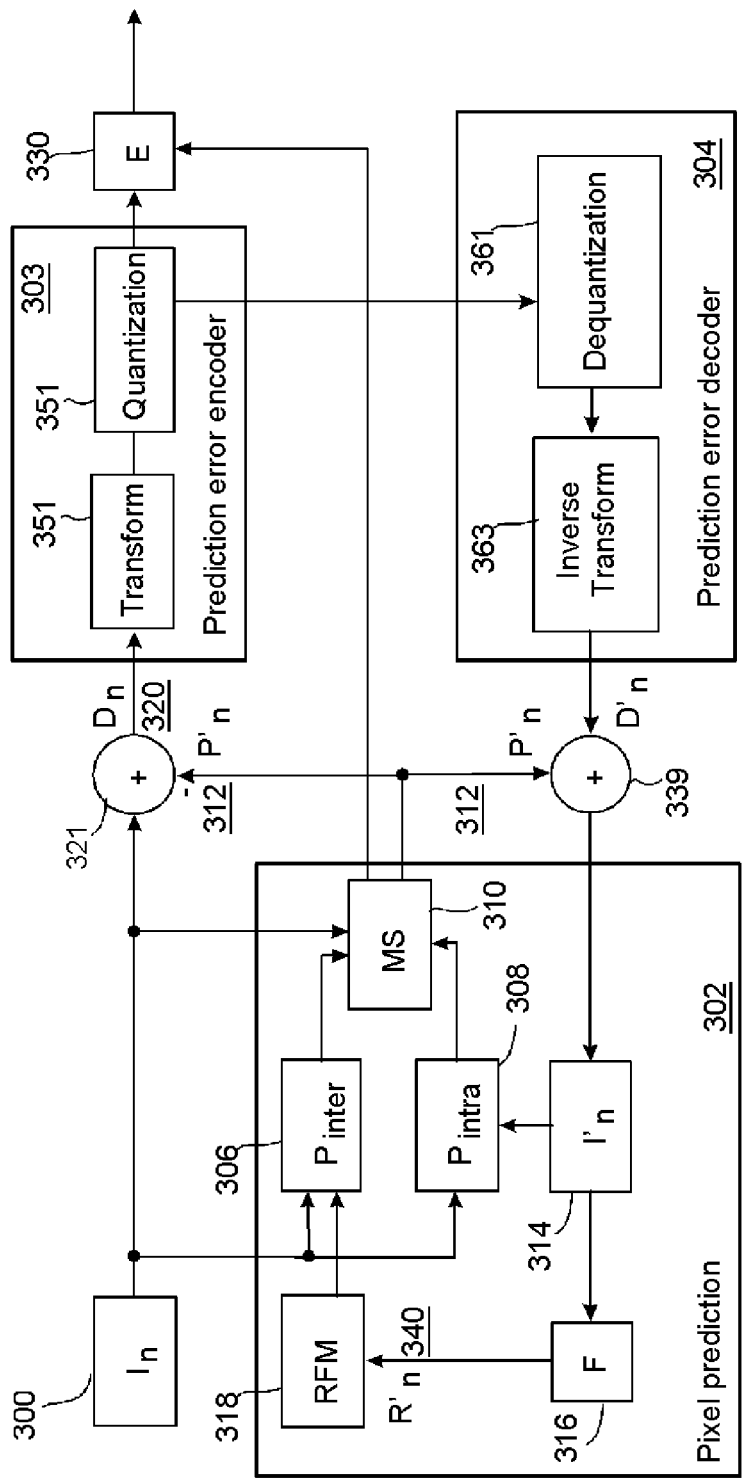
FIGS. 4a and 4b show schematically an embodiment of the invention as incorporated within an encoder.

With respect to FIG. 4a, a block diagram of a video encoder suitable for carrying out embodiments of the invention is shown. Furthermore, with respect to FIGS. 5a and 5b, the operation of the encoder exemplifying embodiments of the invention specifically with respect to the interpolation of the selected surface area is shown in detail.

Figure 4B:
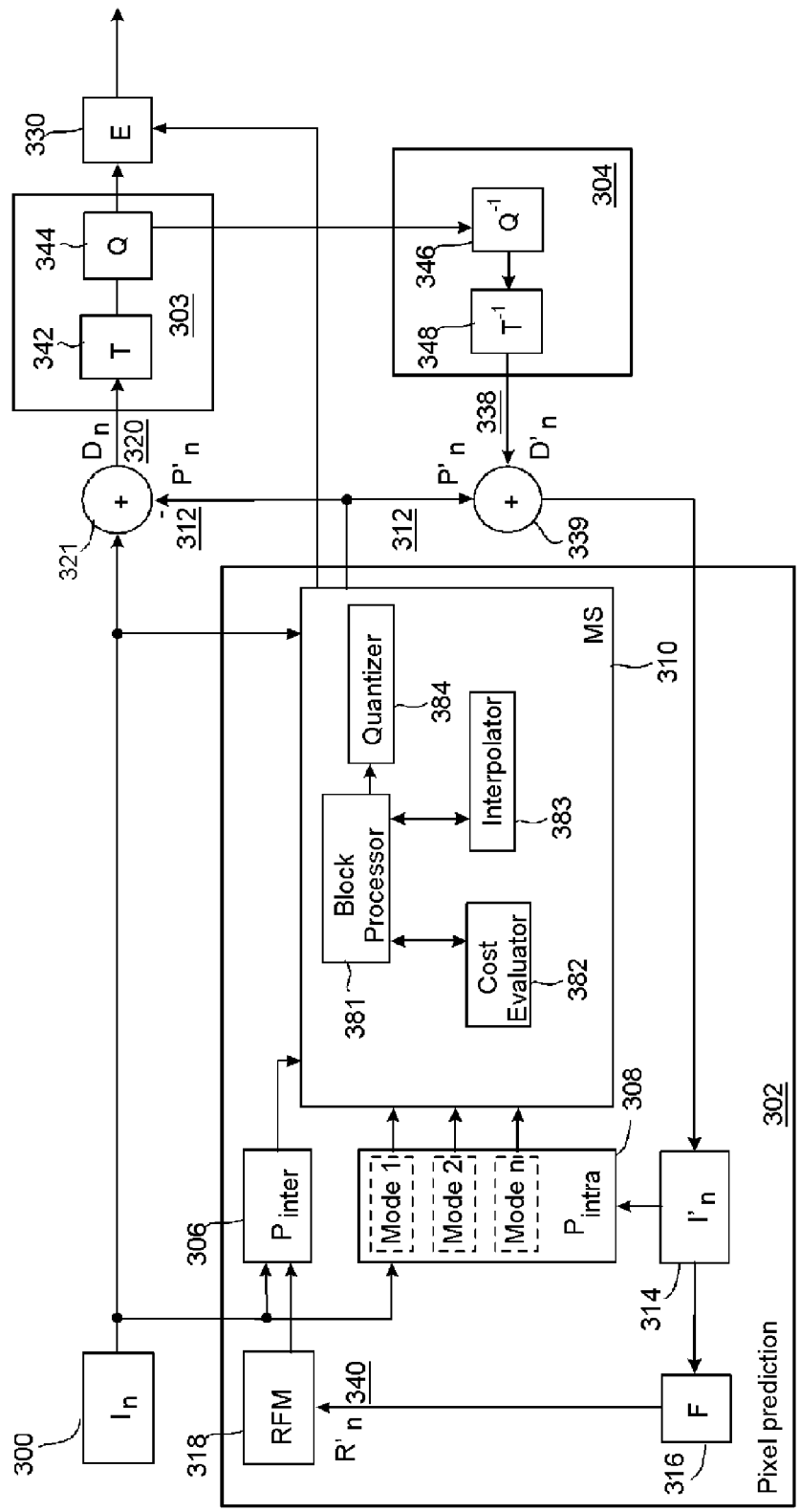

FIG. 4a shows the encoder as comprising a pixel predictor 302, prediction error encoder 303 and prediction error decoder 304. FIG. 4a also shows an embodiment of the pixel predictor 302 as comprising an inter-predictor 306, an intra-predictor 308, a mode selector 310, a filter 316, and a reference frame memory 318. FIG. 4b depicts the mode selector 310 of an example embodiment of the encoder in more detail. The mode selector 310 comprises a block processor 381, a cost evaluator 382 and a surface encoder 383. FIG. 4b also depicts an embodiment of the intra-predictor 308 which comprises a plurality of different intra-prediction modes: Mode 1, Mode 2, . . . , Mode n. The mode selector 310 may also comprise a quantizer 384.

The pixel predictor 302 receives the image 300 to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the image 300.

The block processor 381 determines which encoding mode to use to encode the current block. If the block processor 381 decides to use an inter-prediction mode it will pass the output of the inter-predictor 306 to the output of the mode selector 310. If the block processor 381 decides to use an intra-prediction mode it will pass the output of one of the optional intra-predictor modes to the output of the mode selector 310. In a situation in which the block processor 381 decides to use a surface coding mode it will pass the output of the surface encoder 383 to the output of the mode selector 310. Some example embodiments on the decision of the encoding mode will be discussed later in this application.

The output of the mode selector is passed to a first summing device 321. The first summing device may subtract the pixel predictor 302 output from the image 300 to produce a first prediction error signal 320 which is input to the prediction error encoder 303.

The pixel predictor 302 further receives from a preliminary reconstructor 339 the combination of the prediction representation of the image block 312 and the output 338 of the prediction error decoder 304. The preliminary reconstructed image 314 may be passed to the intra-predictor 308 and to a filter 316. The filter 316 receiving the preliminary representation may filter the preliminary representation and output a final reconstructed image 340 which may be saved in a reference frame memory 318. The reference frame memory 318 may be connected to the inter-predictor 306 to be used as the reference image against which the future image 300 is compared in inter-prediction operations.

The operation of the pixel predictor 302 may be configured to carry out any known pixel prediction algorithm known in the art.

The operation of the prediction error encoder 302 and prediction error decoder 304 will be described hereafter in further detail. In the following examples the encoder generates images in terms of 16×16 pixel macroblocks which go to form the full image or picture. Thus, for the following examples the pixel predictor 302 outputs a series of predicted macroblocks of size 16×16 pixels and the first summing device 321 outputs a series of 16×16 pixel residual data macroblocks which may represent the difference between a first macro-block in the image 300 against a predicted macroblock (output of pixel predictor 302). It would be appreciated that other size macro blocks may be used.

The prediction error encoder 303 comprises a transform block 342 and a quantizer 344. The transform block 342 transforms the first prediction error signal 320 to a transform domain. The transform is, for example, the DCT transform. The quantizer 344 quantizes the transform domain signal, e.g. the DCT coefficients, to form quantized coefficients.

The entropy encoder 330 receives the output of the prediction error encoder and may perform a suitable entropy encoding/variable length encoding on the signal to provide error detection and correction capability. Any suitable entropy encoding algorithm may be employed.

The prediction error decoder 304 receives the output from the prediction error encoder 303 and performs the opposite processes of the prediction error encoder 303 to produce a decoded prediction error signal 338 which when combined with the prediction representation of the image block 312 at the second summing device 339 produces the preliminary reconstructed image 314. The prediction error decoder may be considered to comprise a dequantizer 346, which dequantizes the quantized coefficient values, e.g. DCT coefficients, to reconstruct the transform signal and an inverse transformation block 348, which performs the inverse transformation to the reconstructed transform signal wherein the output of the inverse transformation block 348 contains reconstructed block(s). The prediction error decoder may also comprise a macroblock filter which may filter the reconstructed macroblock according to further decoded information and filter parameters.

Figure 8A:
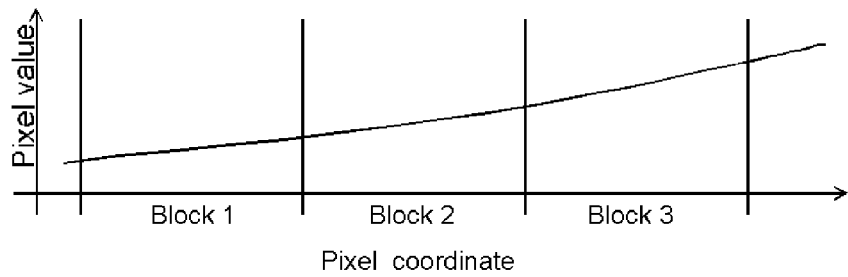
FIG. 8a depicts an example of a part of a one dimensional signal having only moderate changes in pixel values.
Figure 8B:
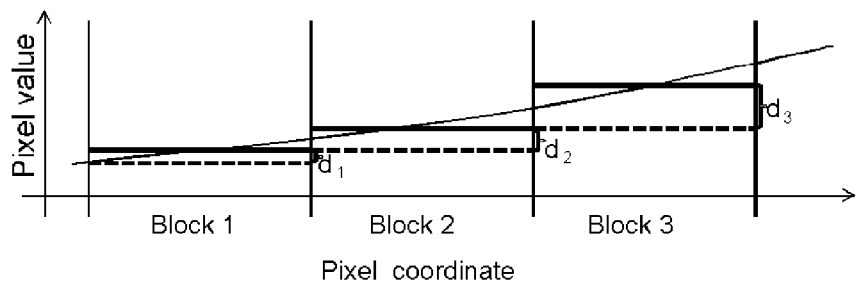
FIG. 8b depicts the signal of FIG. 8a encoded by using a known method.
Figure 8C:
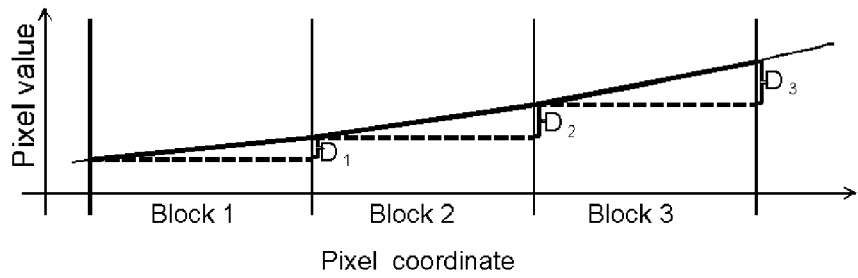
FIG. 8c depicts the signal of FIG. 8a encoded by using an example embodiment of the present invention.

FIGS. 8a-8c demonstrate the effect a quantization may cause to a region of an image containing only small changes in pixel values and how this effect may be reduced when using the present invention. The x-axes illustrates the pixel coordinates and the y-axis illustrate the pixel values. In FIG. 8a an example of a part of a one dimensional signal is depicted. The pixel values are slightly growing from block to block and within the blocks 1, 2 and 3. In FIG. 8b the image signal of FIG. 8a has been coded utilizing spatial prediction (dashed line) and coding the DC coefficient of the DCT transformed signal. In FIG. 8c the image signal of FIG. 8a has been coded with a method according to an example embodiment of the present invention indicating the pixel values of the control points at the picture block boundaries and interpolating the missing pixel values.

Figure 5A:
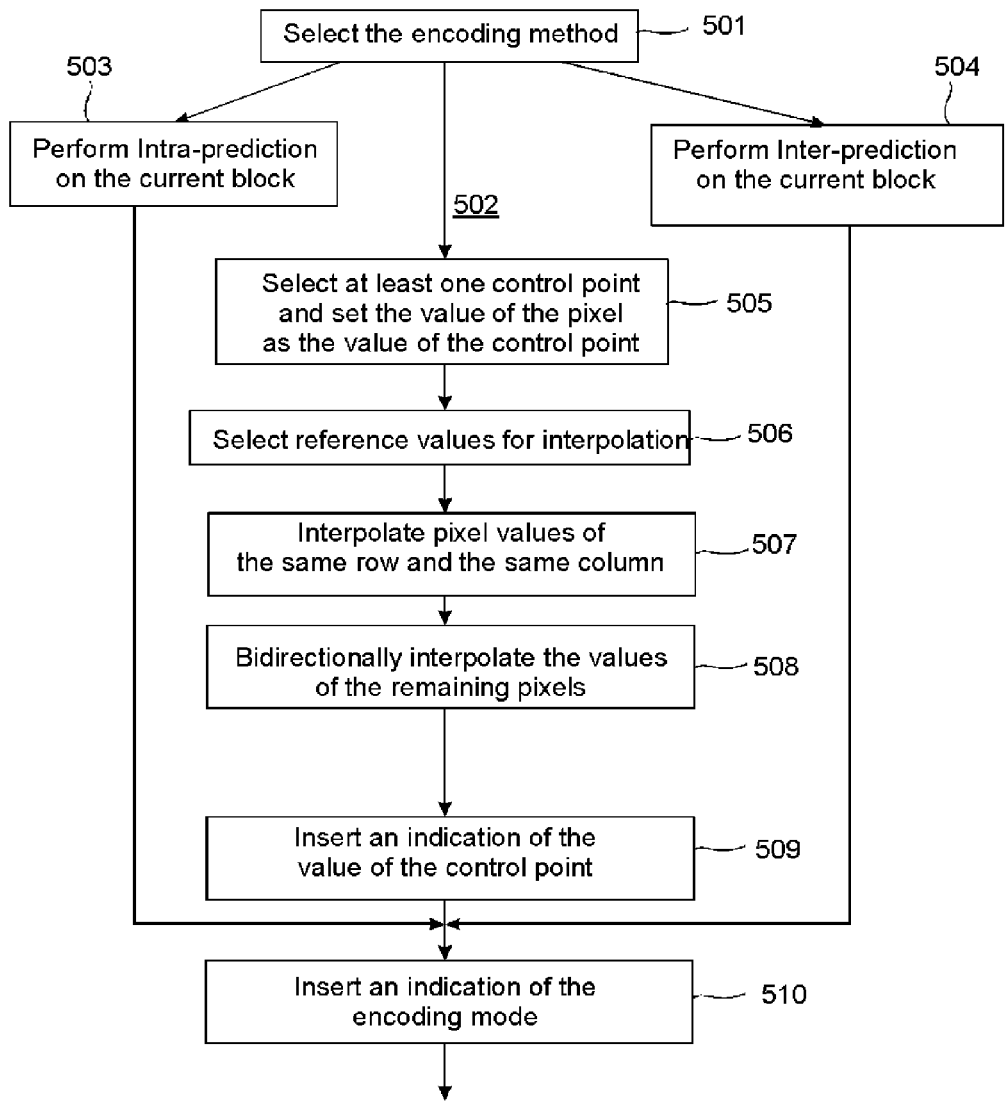
FIGS. 5a and 5b show a flow diagram showing the operation of an embodiment of the invention with respect to the encoder as shown in FIGS. 4a and 4b.

The operation and implementation of the mode selector 310 is shown in further detail with respect to FIG. 5a. On the basis of the prediction signals from the output of the inter-predictor 306, the output of the intra-predictor 308 and/or the image signal 300 the block processor 381 determines which encoding mode to use to encode the current image block. This selection is depicted as the block 500 in FIG. 5a. The block processor 381 may calculate a rate-distortion cost (RD) value or another cost value for the prediction signals which are input to the mode selector 310 and select such an encoding mode 502, 503, 504 for which the determined cost is the smallest. It is also possible that the block processor 381 determines whether the current image block contains a planar region i.e. a region in which there are no changes or only small changes in the image contents and if so, selects the surface coding mode 502.

The mode selector 310 provides an indication of the encoding mode of the current block (501). In this case the indication is indicative of the surface coding mode. The indication may be encoded and inserted to a bit stream or stored into a memory together with the image information.

If the intra-prediction mode is selected, the block is predicted by an intra-prediction method (503). Respectively, if the inter-prediction mode is selected, the block is predicted by an inter-prediction method (504).

Some example embodiments of the surface coding mode operate as follows. The block processor 381 selects one or more control points within the block to be encoded and a pixel value at the control point is set to the desired value of that pixel (block 505). If an image which has been divided into blocks is encoded from left to right and from top to bottom, one option for the control point is the pixel at the lower right corner of the block to be encoded. This is due to the fact that this point is farthest from already encoded pixels in both horizontal and vertical direction. This can be seen from FIGS. 9a and 9b which depict a situation in which a block of 8×8 pixels is to be encoded and this block has neighbouring encoded blocks above and on the left. However, there are also other possibilities to select the control point such as the second last pixel at the second last row, or some other pixel in the block area. It is also possible to select more than one control point, for example two or three control points.

If an image which has been divided into blocks is encoded from right to left and from top to bottom, one option for the control point is the pixel at the lower left corner of the block to be encoded. Also other alternatives than the pixel at the lower right corner or the pixel at the lower left corner may exist for the control point.

Figure 9A:
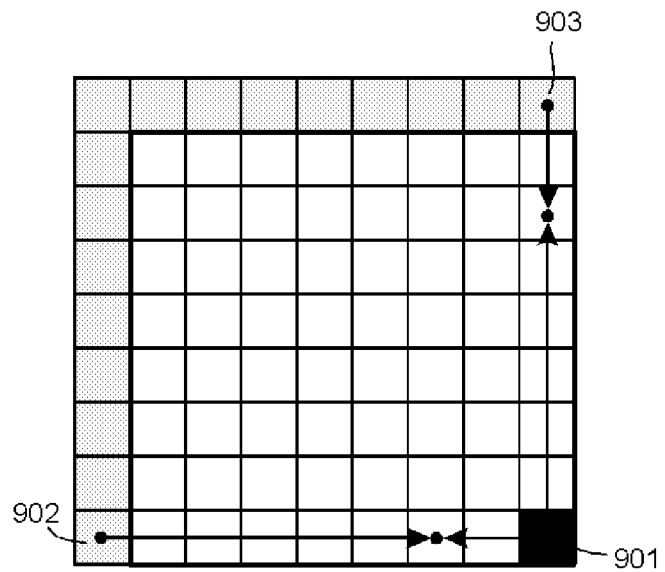
FIGS. 9a and 9b depict an example of a block of 8×8 pixels to be reconstructed having neighbouring processed blocks above and on the left.

When the control point(s) is/are selected, the other pixel values of the current block can be determined by interpolation. The interpolation can be linear or logarithmic or defined by another algorithm. In this example embodiment the interpolation is based on the value of the pixel at the control point and a reference value. In some embodiments the reference value is the value of the already encoded pixel, which is on the same row/column and at the border of the current block and the neighbouring block. In some embodiments the reference value is the closest already decoded value in the image block on the left of the current block (in the horizontal direction) or above the current block (in the vertical direction). The reference value is determined for both the horizontal and vertical interpolation (block 506). In FIG. 9a the control point is depicted with the reference numeral 901, a first reference value for the interpolation in horizontal direction, i.e. the encoded pixel on the same row and at the border of the current block and the neighbouring block, is depicted with the reference numeral 902, and a second reference value for the interpolation in vertical direction, i.e. the encoded pixel on the same column and at the border of the current block and the neighbouring block, is depicted with the reference numeral 903.

The block processor 381 provides the value of the control point 901 and the reference values 902, 903 to the surface encoder 383. The surface encoder 383 interpolates the other values of the last row of the current block on the basis of the value of the control point and the first reference value 902. The surface encoder 383 also interpolates the other values of the last column of the current block on the basis of the value of the control point and the second reference value 903. This step is depicted with block 507 in FIG. 5.

Figure 9B:
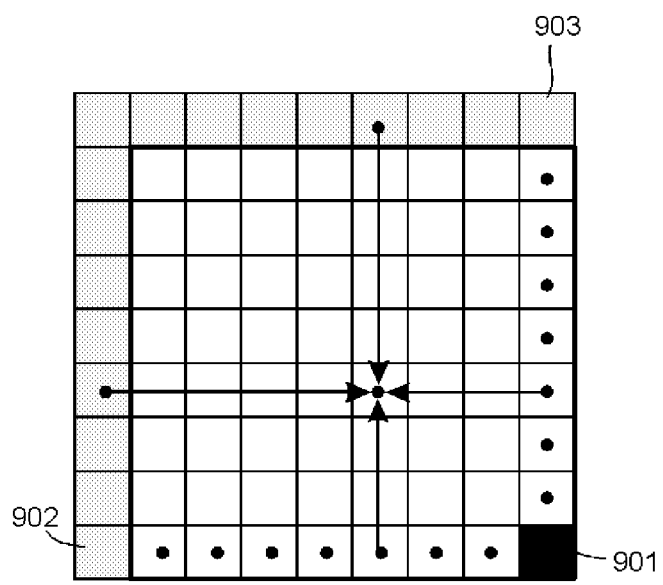

Values of other pixels of the current block can be determined by bidirectional interpolation using the interpolated values of e.g. the last row and the last column and pixel values of the neighbouring blocks i.e. the boundary pixel values (block 508). For example, as depicted in FIG. 9b, the pixel on the fifth row and fifth column of the current block can be determined by the following pixels as reference pixels in the bidirectional interpolation: the fifth pixel of the last row of the current block, the fifth pixel of the last row of the neighbouring block above the current block, the fifth pixel of the last column of the current block, and the fifth pixel of the last column of the neighbouring block to the left of the current block. Respectively, the other pixels can be bidirectionally interpolated by using the corresponding pixel values as reference values.

In some embodiments there may be more than one control point. In such a case one option to determine the values of the other points in the current block is to perform several interpolations so that each interpolation uses one control point as one reference value as presented above, and when all interpolations have been performed, the interpolation results are combined e.g. by averaging the interpolated values of pixels or by some other method.

Figure 12B:
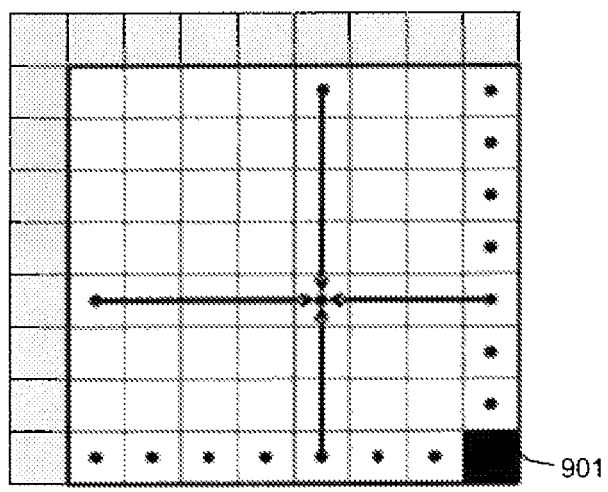
FIGS. 12a and 12b depict another example of a block of 8×8 pixels to be reconstructed using more than one control points.
Figure 12A:
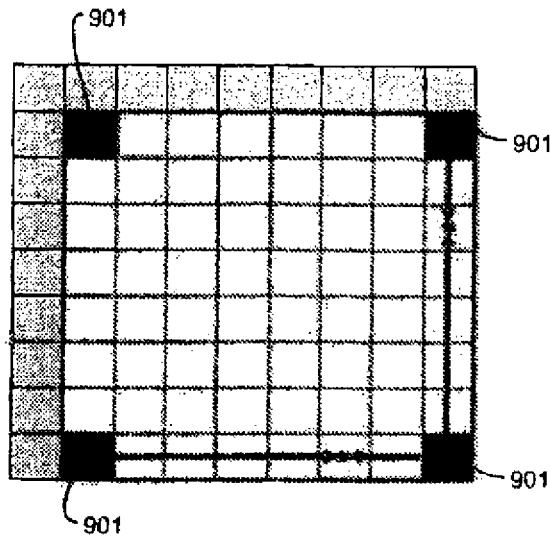

An example of using a multiple of control points is indicated in FIGS. 12a and 12b. In this example four control points are used and the values in the 8×8 block are reconstructed without using the pixel values of the neighboring macroblocks. According to this example the first control point is the pixel at the lower right corner of the current block, a second control point is the pixel at the upper right corner of the current block, the third control point is the pixel at the lower left corner of the current block, and the fourth control point is the pixel at the upper left corner of the current block.

The values of the control points can be used e.g. as follows to obtain the other pixel values of the current block. First, the row at the bottom of the current block and the column at the right edge of the current block are processed first. The row values between the third control point and the first control point can be obtained by interpolation using values of the first control point and the third control point. Correspondingly, the column values between the second control point and the first control point can be obtained by interpolation using the values of the first control point and the second control point. When the pixel values of the last row and the last column have been obtained, the remaining values can be determined by bidirectional interpolation in which the pixel values of the last row and the last column are used together with the values of the first row and the first column, respectively, of the current block.

Figure 12B:
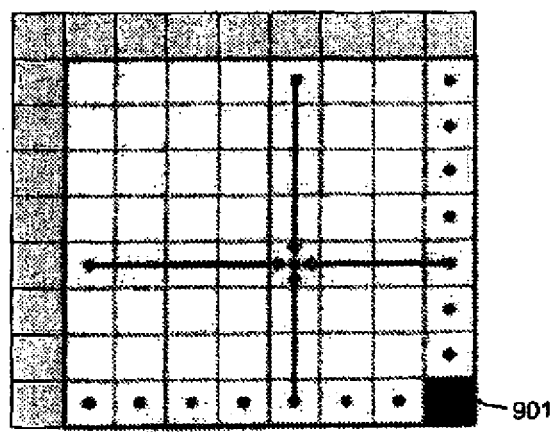

In another embodiment utilizing the principles presented in FIG. 12 also the values of the first row are determined by interpolating between the fourth control point and the second control point and, respectively, the pixel values of the first column are determined by interpolating between the fourth control point and the third control point. After that, the interpolated values of the first row and the last row and the interpolated values of the first column and the last column can be used in bidirectional interpolation to obtain the remaining values of the current block.

In this example of FIGS. 12a and 12b values of at least some of the control points are also used as said reference values but they are selected from the same block, not from the neighbouring blocks.

In some embodiments some reference values may be selected from the neighbouring block(s) and some other reference values may be selected from the current block.

When the encoding mode is the surface coding mode (which may also be called as a planar mode) the block processor 381 forms an indication regarding the control point (509). The indication may include the pixel value of the control point, or it may include a difference between the real pixel value of the control point and a predicted pixel value of the control point. This difference value is called as a delta value in this context. The predicted pixel value may be obtained using one or more earlier (in encoding order) pixel values in the same image. For example, the value of the control point may be provided as a difference between the real value of the control point in the image to be encoded and a value of a pixel at the same location than the control point in a previous (already encoded) block of the same image.

The indication of the value of the control point may also include coordinates of the control point but in some embodiments the location of the control point is predetermined wherein it is not necessary to include the indication of the location of the control point in the bitstream and transmit it to the decoder. In a situation in which there are more than one control point, which have predetermined locations in an image block, the block processor 381 may include an index of the control point and the delta value (or the real value) of the control point into the bit stream wherein the decoder can use the index to distinguish delta values of each control point from each other.

Figure 10:
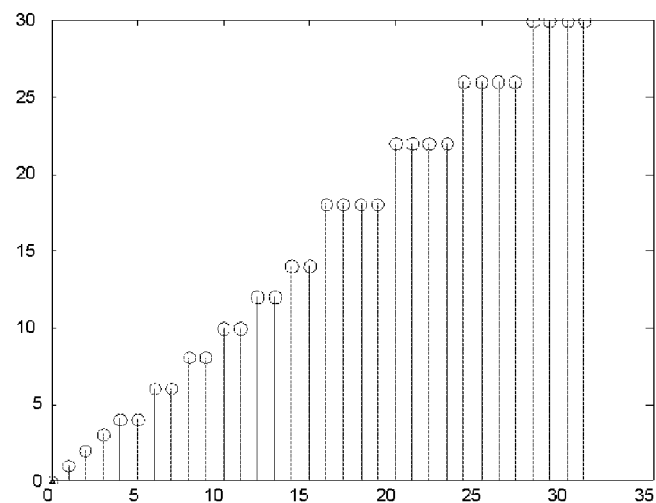
FIG. 10 shows an example of an uneven quantization.

The real value or the delta value of the control point may also be quantized by the optional quantizer 384 to further reduce the amount of information needed to indicate the value of the control point to the decoder. The quantizer 384 may use the same quantization step for all possible control point values or delta values, or the quantizer 384 may alter the quantization step value depending on the control point value or the delta value. For example, small control point values or delta values may be left without quantization (i.e. the quantization step is one) and for larger control point values or delta values a larger quantization step can be used. In some embodiments the quantizer 384 may produce the same quantized values for several control point values or delta values i.e. the quantization can be called as uneven quantization. FIG. 10 shows an example of this embodiment. In this example the quantizer 384 outputs delta values from 0 to 4 as such, whereas when the delta value is 5 the quantizer 384 outputs 4, similarly, delta values 6 and 7 cause the quantizer 384 to output 6, delta values 8 and 9 cause the quantizer 384 to output 9, . . . , delta values 28-31 cause the quantizer 384 to output 30 as the quantized delta value. These delta values may further be encoded by e.g. variable length codewords to further reduce the amount of information needed to represent the delta values.

The value of each control point can be encoded independent from values of other control points or they can be jointly encoded to further exploit any correlation between the control points. For example, in a situation in which the same control point value or delta value is selected for a number of successive interpolated blocks, the block processor 381 may insert the (delta) value once and indicate the number of successive interpolated blocks the (delta) value is applied for.

In connection with the surface coding mode the block processor 381 may in some embodiments also determine a residual signal for the current block. It may be obtained by pixel-wise calculating a difference between the real value of the pixel and the interpolated value of the pixel. This residual signal may then be transformed to a transform domain by the transforming block 342 and the transform coefficients may be quantized by the quantizer 344.

In some embodiments the interpolation may be combined with various kinds of filters and the reference pixels used in the process may be also filtered.

Figure 11:
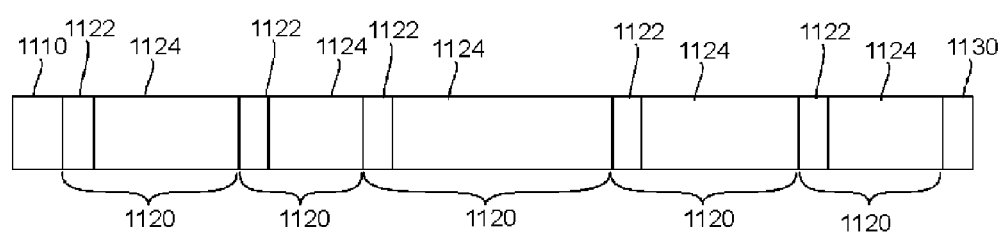
FIG. 11 shows an example of a bit stream containing image information encoded by a method according to an example embodiment of the present invention.

In an example embodiment, as is depicted in FIG. 11, the bit stream of an image comprises an indication of the beginning of an image 1110, image information of each block of the image 1120, and indication of the end of the image 1130. The image information of each block of the image 1120 may include the indication of the prediction mode 1122, and the indication of pixel values of the block 1124 which may actually include coefficients of the residual signal when the inter- or intra-prediction has been used for the image block. If the surface coding mode has been used, the indication of pixel values of the block 1124 may include the (quantized and encoded) delta value(s) of the control point(s). It is obvious that the bit stream may also comprise other information. Further, this is only a simplified image of the bit stream and in practical implementations the contents of the bit stream may be different from what is depicted in FIG. 11.

The bit stream may further be encoded by the entropy encoder 330.

Figure 6:
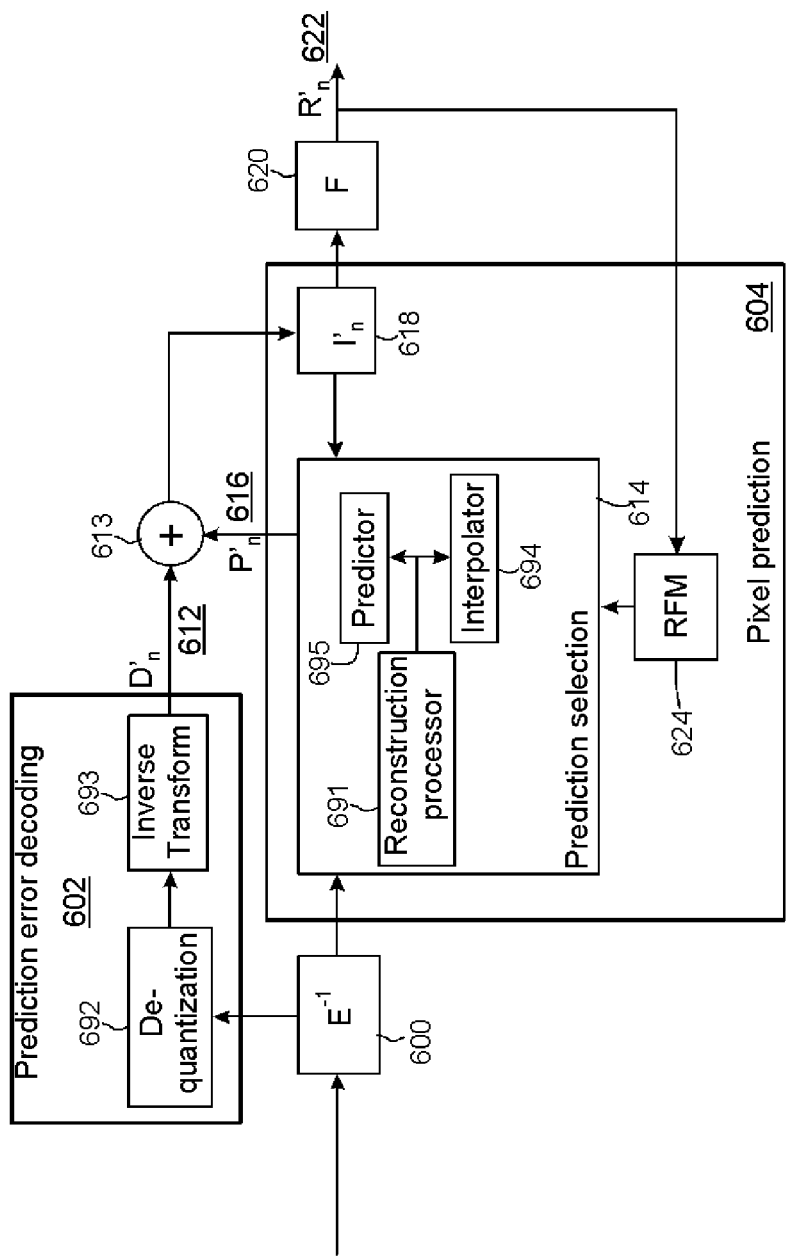
FIG. 6 shows a schematic diagram of a decoder according to some embodiments of the invention.

In the following the operation of an example embodiment of the decoder 600 is depicted in more detail with reference to FIG. 6.

Although the embodiments above have been described with respect to the size of the macroblock being 16×16 pixels, it would be appreciated that the methods and apparatus described may be configured to handle macroblocks of different pixel sizes.

For completeness a suitable decoder is hereafter described. At the decoder side similar operations are performed to reconstruct the image blocks. FIG. 6 shows a block diagram of a video decoder suitable for employing embodiments of the invention. The decoder shows an entropy decoder 600 which performs an entropy decoding on the received signal. The entropy decoder thus performs the inverse operation to the entropy encoder 330 of the encoder described above. The entropy decoder 600 outputs the results of the entropy decoding to a prediction error decoder 602 and pixel predictor 604.

The pixel predictor 604 receives the output of the entropy decoder 600. A predictor selector 614 within the pixel predictor 604 determines that an intra-prediction, an inter-prediction, or interpolation operation is to be carried out. The predictor selector may furthermore output a predicted representation of an image block 616 to a first combiner 613. The predicted representation of the image block 616 is used in conjunction with the reconstructed prediction error signal 612 to generate a preliminary reconstructed image 618. The preliminary reconstructed image 618 may be used in the predictor 614 or may be passed to a filter 620. The filter 620 applies a filtering which outputs a final reconstructed signal 622. The final reconstructed signal 622 may be stored in a reference frame memory 624, the reference frame memory 624 further being connected to the predictor 614 for prediction operations.

The prediction error decoder 602 receives the output of the entropy decoder 600. A dequantizer 692 of the prediction error decoder 602 may dequantize the output of the entropy decoder 600 and the inverse transform block 693 may perform an inverse transform operation to the dequantized signal output by the dequantizer 692. The output of the entropy decoder 600 may also indicate that prediction error signal is not to be applied and in this case the prediction error decoder produces an all zero output signal. This is the case for example with the example embodiment of this invention.

However some other embodiments of the invention apply prediction error decoder unit to decode a non-zero prediction error signal.

The decoder selects the 16×16 pixel residual macroblock to reconstruct. The selection of the 16×16 pixel residual macroblock to be reconstructed is shown in step 700.

Figure 7:
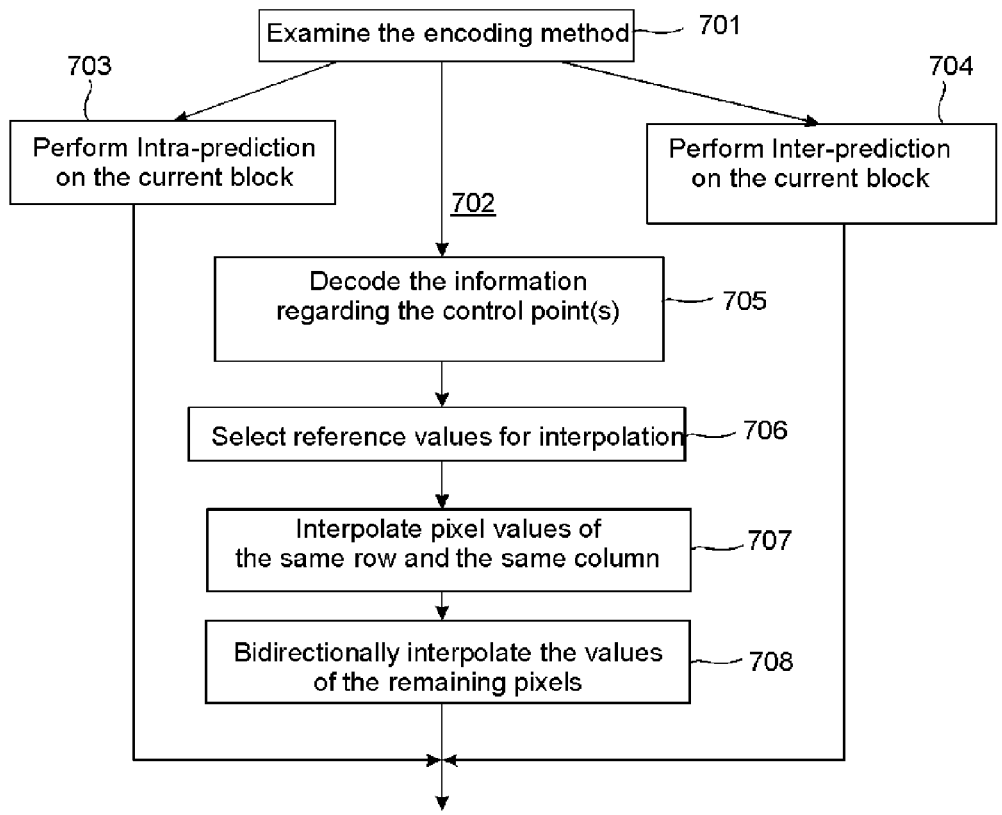
FIG. 7 shows a flow diagram of showing the operation of an embodiment of the invention with respect to the decoder shown in FIG. 6.

The decoder receives information on the encoding mode used when the current block has been encoded. The indication is decoded, when necessary, and provided to the reconstruction processor 691 of the prediction selector 614. The reconstruction processor 691 examines the indication (block 701 in FIG. 7) and selects the intra-prediction mode (block 703), if the indication indicates that the block has been encoded using intra-prediction, inter-prediction mode (block 704), if the indication indicates that the block has been encoded using inter-prediction, or the surface coding mode (arrow 702 in FIG. 7), if the indication indicates that the block has been encoded using interpolation. In this context only the operation of the decoder in the surface coding mode is described in more detail.

In the surface coding mode the reconstruction processor 691 decodes information regarding the control point (block 705). If predetermined control points are used the reconstruction processor 691 need not receive the location of the control point(s) but it can use e.g. a parameter which contains information of the predetermined location of the control point(s). The reconstruction processor 691 decodes information of the value of the control point. As it was described above, the value of the control point may have been encoded as a difference between the real value of the control point and a predicted value of the control point wherein the reconstruction processor 691 performs similar operation to obtain the value of the control point. The reconstruction processor 691 also determines the reference points which have been used by the encoder in the interpolation (block 706), and provides the value of the control point and the reference values to the surface decoder 694 of the decoder which interpolates the yet unknown pixel values at the same row and at the same column than the control point (block 707). When these pixel values have been interpolated pixel values of the rest of the current block can be obtained by implementing the similar interpolation method(s) than the encoder used in encoding the remaining pixel values of the same image block (block 708).

In some embodiments the pixel values obtained with the surface coding mode can further be refined to get the final pixel values. For example, the pixel values obtained by the interpolation may be filtered or they may be added to other signals such as a residual data or motion compensated prediction data.

In the intra-prediction mode the reconstruction processor 691 may provide the preliminary reconstructed image 618 to the predictor block 695 for reconstruction of the pixel values of the current block.

It is noted here that the surface coding mode can be applied to a number of different color components independently, wherein pixel values of each color component are interpolated with no reference to other color components, or jointly, wherein the interpolation may be applied to a combination of the color components.

Figure 5B:
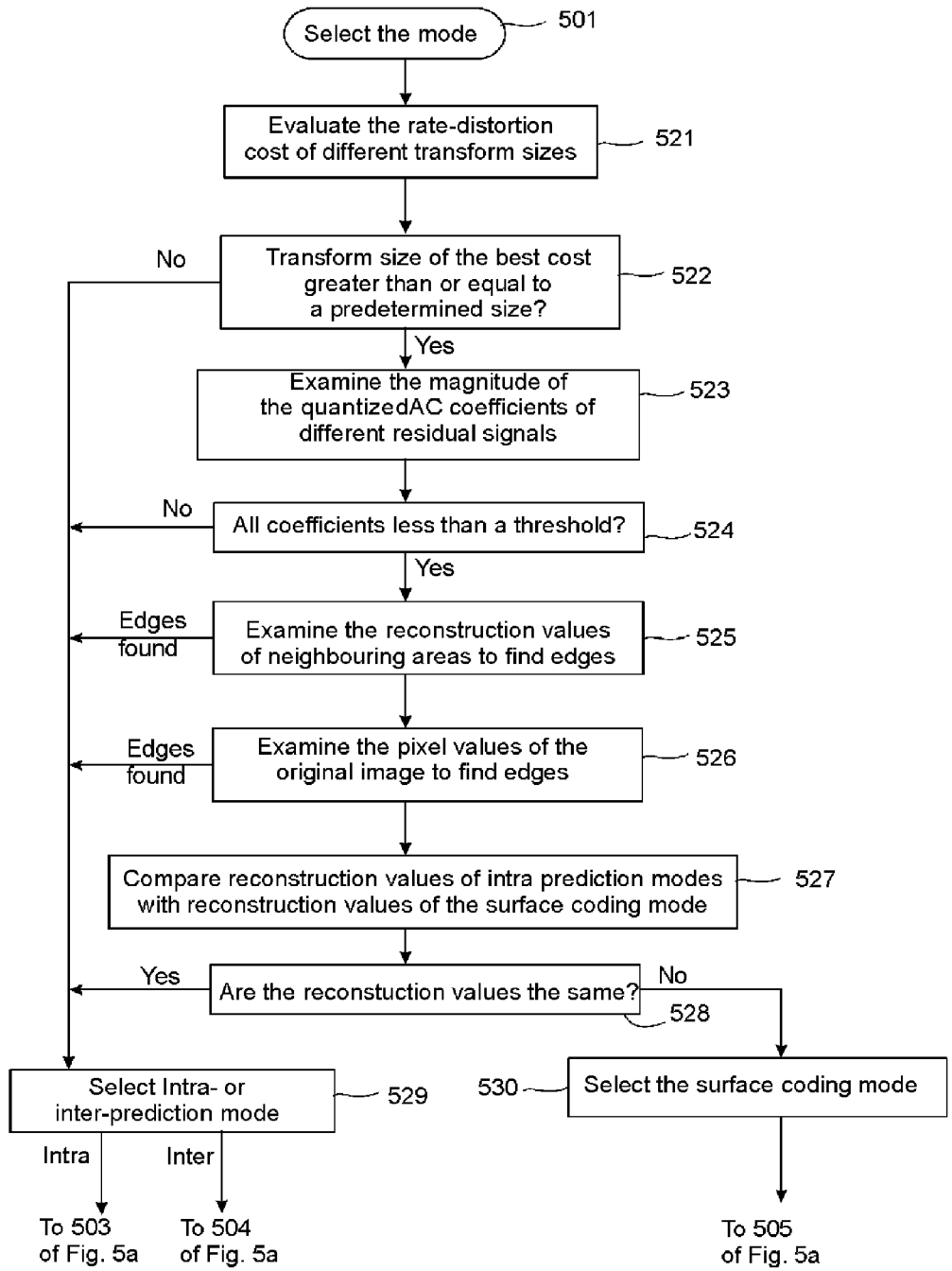

Next, some example embodiments of the operation regarding the selection of the surface coding mode will be described in more detail with reference to the flow diagram of FIG. 5*b*. The block processor 381 of the encoder examines whether the current block has a flat nature or not. This can be performed e.g. by evaluating one or more conditions. One condition may be the rate-distortion cost wherein the block processor 381 may evaluate the rate-distortion costs of different transform sizes, for example 4×4, 8×8 and 16×16 (block 521). The rate-distortion cost may be calculated, for example, by using the equation (2).

$$RD = D + \lambda \text{rate} \quad (2)$$

where D represents a distortion of a reconstructed macroblock compared to the original macroblock, rate represents the coding bit rate of the current macroblock and $\lambda$ is a Lagrangian coefficient.

When the evaluation shows that the transform size which gives the best cost is a predetermined size or larger than that, for example a block of 16×16 pixels, a first condition is fulfilled (block 522).

Another condition may relate to the magnitude of the (quantized) AC components of the residual signal. This may be evaluated by an intra-prediction using one of more intra-prediction modes, obtaining residual signals for each mode, transforming the residual signals to obtain transform coefficients and quantizing the transform coefficients. The block processor may then examine the quantized coefficients and if all the quantized AC coefficients are equal to zero or smaller than a certain threshold (block 523), it can be deduced that the image block probably contains a flat surface wherein a second condition is met (block 524).

In DCT transform the result is a DC coefficient and a set of AC coefficients. The AC coefficients indicate the variations in the image content of the image block. If the AC coefficients are zero or relatively small it may indicate that the image contents of the image block is quite uniform i.e. it does not have significant changes in its contents.

The block processor 381 may also use reconstruction values of neighbouring areas (adjacent blocks in vertical and horizontal direction) and presence of any edges between the neighbouring blocks and the current block (block 525). The result may be used as a third condition.

Further, the pixel values in the original image and presence of any edges and the energy of high frequency components in the original image may be used as a fourth condition in the determination of the selection of the surface coding mode (block 526).

In some embodiments the reconstruction values of the surface coding mode can be compared with reconstruction values of regular intra prediction modes as a fifth condition (block 527) in the determination of the selection of the surface coding mode. If the reconstruction values of the surface coding mode are the same than the reconstruction values of regular intra prediction modes the intra-prediction mode may be selected (block 528).

The block processor 381 may then use the first condition, the second condition, the third condition, the fourth condition and/or the fifth condition or any combination of the conditions to decide whether the surface coding mode (block 505) or another prediction mode (block 503, 504) is used is used to encode the current block.

Yet another example embodiment regarding the selection of the surface coding mode is depicted. For the current image block which may be a 16×16 macroblock, the block processor 381 evaluates the surface coding mode only if all of the below conditions are satisfied:

First, the best mode according to the rate-distortion cost is intra-coding with a large transform size (e.g. 16×16).

Second, all the quantized coefficients of the residual signal are zero or only the DC coefficient is non-zero.

Third, the high frequency energy of the original video signal within the corresponding block is lower than a threshold. This could be checked by transforming the original signal using DCT and calculating the total energy of the highest N coefficients, where N is greater than zero and less than the number of transform coefficients.

In this non-limiting example embodiment, if all the above conditions are met, the surface coding mode is evaluated as an alternative to the other coding modes by the block processor 381. The surface coding mode is selected over other modes if the following criteria are met:

First, the reconstruction error with surface coding mode is not significantly higher than the reconstruction error of using traditional intra coding modes.

Second, the reconstruction of the surface coding mode is not identical to the reconstruction of the intra coding mode.

The invention can be implemented in various ways. For example, the decision of using the surface coding mode can be based on only analyzing the original video signal; the decision can be based on the comparison of the rate-distortion costs of the different modes as such or by adding some bias on one or some of the modes before the comparison; the decision can be based on filtered video signal or samples, or samples undergone some other processing. The surface coding mode can also be evaluated in presence of quantized AC coefficients i.e. in the situation in which all AC coefficients are not zero.

The expression "adding bias on one or some of the modes" means that a bias value is added to or subtracted from the evaluated rate-distortion cost value before the value is compared with other cost values.

In some embodiments there is provided a method for reducing ringing artefacts when truncated transforms of the residual signal is used. One method is to apply a low pass filter to the residual signal prior to using truncated transform to reduce the high frequency component in the residual signal, which would cause ringing artefacts when coded with truncated transforms. Another method is deciding not to use truncated transforms by comparing the prediction and reconstruction error of the blocks within the macroblock.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore in some embodiments of the invention the coder and decoder may share some or all common elements.

Although the above examples describe embodiments of the invention operating within a codec within an electronic device, it would be appreciated that the invention as described below may be implemented as part of any video codec. Thus, for example, embodiments of the invention may be implemented in a video codec which may implement video coding over fixed or wired communication paths.

Thus, user equipment may comprise a video codec such as those described in embodiments of the invention above.

It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

In some embodiments said block of pixels may comprise at least two rows of pixels and at least two columns of pixels, wherein the selector may further be configured for selecting a second reference point.

In some embodiments said first reference point may selected from an encoded block of pixels adjacent to the selected block of pixels.

In some embodiments information indicative of the selected encoding method may be encoded into a bit stream.

Another embodiment of an encoder comprises a selector configured for selecting an encoding method from a set of encoding methods comprising at least a first encoding method and a second encoding method for encoding a block of pixels of an image; wherein said selector is further configured for: selecting at least one control point among the pixels of said block of pixels; and selecting a first reference point different from said control point; wherein the apparatus further comprises a determinator configured for determining values of the other pixels of said selected block of pixels on the basis of the value of said control point and the value of said at least one reference point.

Another embodiment of a decoder apparatus comprises an analyser configured for examining an indication of an encoding method of a block of pixels of an image to be decoded; a decoding method selector configured for selecting a first decoding method when said determined encoding method is a first encoding method; and a reconstructor configured for: selecting at least one control point among the pixels of said block of pixels to be decoded; and selecting a first reference point different from said control point; and determining values of the other pixels of said block of pixels to be decoded on the basis of the value of said control point and the value of said at least one reference point.

Another embodiment of an apparatus comprises: a selector configured for selecting an encoding method from a set of encoding methods comprising at least a first encoding method and a second encoding method for encoding a block of pixels of an image; wherein said selector is further configured for using at least one of the following to determine whether to select the first encoding method for encoding the selected block of pixels: evaluating a rate-distortion cost for at least two different transform sizes of the selected block; determining which transform size produces the best rate-distortion cost, and comparing the transform size which produces the best rate-distortion cost with a threshold to obtain a first condition; using said second encoding method for encoding the selected block of pixels, obtaining a residual signal on the basis of the selected block of image and the encoding result, transforming the residual signal to form transform coefficients, and evaluating the magnitude of the transform coefficients to obtain a second condition; examining whether an adjacent block of pixels contains an edge to obtain a third condition; examining whether the selected block of pixels contains an edge to obtain a fourth condition; or comparing reconstruction values of the first encoding method with reconstruction values of said second encoding method to obtain a fifth condition.

Another embodiment of a method comprises selecting an encoding method from a set of encoding methods comprising at least a first encoding method and a second encoding method for encoding a block of pixels of an image comprising using at least one of the following to determine whether to select the first encoding method for encoding the selected block of pixels: evaluating a rate-distortion cost for at least two different transform sizes of the selected block; determining which transform size produces the best rate-distortion cost, and comparing the transform size which produces the best rate-distortion cost with a threshold to obtain a first condition; using said second encoding method for encoding the selected block of pixels, obtaining a residual signal on the basis of the selected block of image and the encoding result, transforming the residual signal to form transform coefficients, and evaluating the magnitude of the transform coefficients to obtain a second condition; examining whether an adjacent block of pixels contains an edge to obtain a third condition; examining whether the selected block of pixels contains an edge to obtain a fourth condition; or comparing reconstruction values of the first encoding method with reconstruction values of said second encoding method to obtain a fifth condition.

What is claimed is:

1. An apparatus comprising at least one processor and at least one memory including computer program code, the at least one memory and computer program code configured to, with the processor, cause the apparatus to:
   select an encoding method from a set of encoding methods comprising at least a first encoding method and a second encoding method for encoding a block of pixels of an image;
   select at least one control point among the pixels of said block of pixels, wherein said control point is selected from any pixel of said block of pixels;
   select a first reference point different from said control point; and
   determine values of the other pixels of said selected block of pixels on the basis of the value of said control point and the value of said first reference point.

2. The apparatus of claim 1, wherein the at least one memory and computer program code are further configured to, with the processor, cause the apparatus to:
   select said first reference point from either one of:
   the selected block of pixels, and
   an encoded block of pixels adjacent to the selected block of pixels.

3. The apparatus of claim 1, wherein the at least one memory and computer program code are configured to, with the processor, cause the apparatus to select said first reference point from the same row of said encoded block of pixels.

4. The apparatus of claim 1, wherein said block of pixels comprises at least two rows of pixels and at least two columns of pixels, and the at least one memory and computer program code are further configured to, with the processor, cause the apparatus to:
   use the first reference point and the control point to determine the values of the pixels on the same row than said control point and said first reference point;
   use the second reference point and the control point to determine the values of the pixels on the same column than said control point and said first reference point; and
   determine the other values of the pixels of the selected block of pixels by using the determined values of the pixels on the same row than said control point and said first reference point, the values of the pixels on the same column than said control point and said first reference point, and the values of pixels of an encoded block of pixels adjacent to the selected block.

5. The apparatus of claim 1, wherein the at least one memory and computer program code are further configured to, with the processor, cause the apparatus to use interpolation in said determining values of the other pixels of said selected block of pixels.

6. The apparatus of claim 1, wherein said image comprises at least four blocks of pixels in two rows and in two columns, each block of pixels comprising at least two rows of pixels and two columns of pixels, the at least one memory and computer program code are further configured to, with the processor, cause the apparatus to:
   encode the image block-wise from left to right and from top to bottom, wherein the selector is configured for:
   select the pixel at the lower right corner of the block as the control point;
   select the pixel at the lower right corner of the neighbouring encoded block on the left of the selected block as the first reference point; and select the pixel at the lower right corner of the neighbouring encoded block above the selected block as the second reference point.

7. A method comprising:
selecting an encoding method from a set of encoding methods comprising at least a first encoding method and a second encoding method for encoding a block of pixels of an image;
selecting at least one control point among the pixels of said block of pixels, wherein said control point is elected from any pixel of said block of pixels;
selecting a first reference point different from said control point; and
determining values of the other pixels of said selected block of pixels on the basis of the value of said control point and the value of said first reference point.

8. The method of claim 7 further comprising:
selecting said first reference point from either one of:
the selected block of pixels, and
an encoded block of pixels adjacent to the selected block of pixels.

9. The method of claim 7 further comprising:
selecting said first reference point from the same row of said encoded block of pixels.

10. The method of claim 7, wherein said block of pixels comprises at least two rows of pixels and at least two columns of pixels, the method further comprising:
using the first reference point and the control point to determine the values of the pixels on the same row than said control point and said first reference point;
using the second reference point and the control point to determine the values of the pixels on the same column than said control point and said first reference point; and
determining the other values of the pixels of the selected block of pixels by using the determined values of the pixels on the same row than said control point and said first reference point, the values of the pixels on the same column than said control point and said first reference point, and the values of pixels at the border of the selected block and encoded blocks adjacent to the selected block.

11. The method of claim 7 further comprising:
using interpolation to determine values of the other pixels of said selected block of pixels.

12. The method of claim 7, wherein said image comprises at least four blocks of pixels in two rows and in two columns, each block of pixels comprising at least two rows of pixels and two columns of pixels, the method further comprising:
encoding the image block-wise from left to right and from top to bottom;
selecting the pixel at the lower right corner of the block as the control point;
selecting the pixel at the lower right corner of the neighbouring encoded block on the left of the selected block as the first reference point; and
selecting the pixel at the lower right corner of the neighbouring encoded block above the selected block as the second reference point.

13. A computer program product comprising a non-transitory computer readable medium having program code portions stored thereon, the program code portions configured, upon execution to:
select an encoding method from a set of encoding methods comprising at least a first encoding method and a second encoding method for encoding a block of pixels of an image;
select at least one control point among the pixels of said block of pixels, wherein said control point is selected from any pixel of said block of pixels;
select a first reference point different from said control point; and
determine values of the other pixels of said selected block of pixels on the basis of the value of said control point and the value of said first reference point.

14. An apparatus comprising at least one processor and at least one memory including computer program code, the at least one memory and computer program code configured to, with the processor, cause the apparatus to:
examine an indication of an encoding method of a block of pixels of an image to be decoded;
select a first decoding method when said determined encoding method is a first encoding method;
select at least one control point among the pixels of said block of pixels to be decoded, wherein the control point is selected from any pixel of the block of pixels;
select a first reference point different from said control point; and
select values of the other pixels of said block of pixels to be decoded on the basis of the value of said control point and the value of said first reference point.

15. The apparatus of claim 14 wherein the at least one memory and computer program code are further configured to, with the processor, cause the apparatus to:
receive an indication of the value and the location of the control point.

16. The apparatus of claim 14 wherein the at least one memory and computer program code are further configured to, with the processor, cause the apparatus to:
select said first reference point from either one of:
the block of pixels to be decoded, and
an already decoded block of pixels adjacent to the block of pixels to be decoded.

17. The apparatus of claim 14 wherein the at least one memory and computer program code are further configured to, with the processor, cause the apparatus to:
select said first reference point from the same row of said block of pixels to be decoded.

18. The apparatus of claim 14 wherein said block of pixels to be decoded comprises at least two rows of pixels and at least two columns of pixels, the at least one memory and computer program code are further configured to, with the processor, cause the apparatus to:
use the first reference point and the control point to determine the values of the pixels on the same row than said control point and said first reference point;
use the second reference point and the control point to determine the values of the pixels on the same column than said control point and said first reference point; and
determine the other values of the pixels of the block of pixels to be decoded by using the determined values of the pixels on the same row than said control point and said first reference point, the values of the pixels on the same column than said control point and said first reference point, and the values of pixels of an already decoded block adjacent to the block of pixels to be decoded.

19. The apparatus of claim 14 wherein the at least one memory and computer program code are further configured to, with the processor, cause the apparatus to use interpolation in said determining values of the other pixels of said block of pixels to be decoded.

20. A method comprising:
examining an indication of an encoding method of a block of pixels of an image to be decoded;
selecting a first decoding method when said determined encoding method is a first encoding method;
selecting at least one control point among the pixels of said block of pixels, wherein the control point is selected from any pixel of the block of pixels;
selecting a first reference point different from said control point; and
determining values of the other pixels of said selected block of pixels on the basis of the value of said control point and the value of said first reference point.

21. The method of claim 20 further comprising:
receiving an indication of the value and the location of the control point.

22. The method of claim 20 further comprising:
selecting said first reference point from either one of
the selected block of pixels, and
an encoded block of pixels adjacent to the selected block of pixels.

23. The method of claim 20 further comprising:
selecting said first reference point from the same row of said encoded block of pixels.

24. The method of claim 20 wherein said block of pixels comprises at least two rows of pixels and at least two columns of pixels, the method further comprising:
using the first reference point and the control point to determine the values of the pixels on the same row than said control point and said first reference point;
using the second reference point and the control point to determine the values of the pixels on the same column than said control point and said first reference point; and
determining the other values of the pixels of the selected block of pixels by using the determined values of the pixels on the same row than said control point and said first reference point, the values of the pixels on the same column than said control point and said first reference point, and the values of pixels of an already decoded block adjacent to the selected block.

25. The method of claim 20 further comprising:
using interpolation to determine values of the other pixels of said selected block of pixels.

26. The method of claim 20 wherein said image comprises at least four blocks of pixels in two rows and in two columns, each block of pixels comprising at least two rows of pixels and two columns of pixels, the method further comprising:
decoding the image block-wise from left to right and from top to bottom:
selecting the pixel at the lower right corner of the block as the control point;
selecting the pixel at the lower right corner of the neighbouring decoded block on the left of the selected block as the first reference point; and
selecting the pixel at the lower right corner of the neighbouring decoded block above the selected block as the second reference point.

27. A computer program product comprising a non-transitory computer readable medium having program code portions stored thereon, the program code portions configured, upon execution to:
determine an encoding method of an encoded block of pixels of an image to decode the encoded block of pixels;
select a first decoding method when said determined encoding method is a first encoding method;
select at least one control point among the pixels of said encoded block of pixels, wherein the control point is selceted from any pixel in the block of pixels;
select a first reference point different from said control point; and
determine values of the other pixels of said encoded block of pixels on the basis of the value of said control point and the value of said at least one reference point.

* * * * *

UNITED STATES PATENT AND TRADEMARK OFFICE
CERTIFICATE OF CORRECTION

Page 1 of 2

PATENT NO. : 8,724,692 B2
APPLICATION NO. : 12/986885
DATED : May 13, 2014
INVENTOR(S) : Lainema et al.

It is certified that error appears in the above-identified patent and that said Letters Patent is hereby corrected as shown below:

Title page,
Delete Drawing Sheet 12 and substitute therefor the Drawing Sheet 12 consisting of Fig. 12a and Fig. 12b as shown on the attached page.

In the Claims,

Column 21, Claim 7,
Line 10, "elected" should read --selected--.

Column 24, Claim 27,
Line 31, "selceted" should read --selected--.

Signed and Sealed this
Nineteenth Day of August, 2014

Michelle K. Lee
*Deputy Director of the United States Patent and Trademark Office*